United States Patent
Lee

(10) Patent No.: US 10,509,232 B2
(45) Date of Patent: Dec. 17, 2019

(54) STEREOSCOPIC IMAGE DISPLAY DEVICE USING SPATIAL-DIVISIONAL DRIVING AND METHOD OF DRIVING THE SAME

(75) Inventor: Juyoung Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 369 days.

(21) Appl. No.: 13/609,538

(22) Filed: Sep. 11, 2012

(65) Prior Publication Data

US 2013/0141402 A1  Jun. 6, 2013

(30) Foreign Application Priority Data

Dec. 6, 2011 (KR) .......................... 10-2011-0129556

(51) Int. Cl.
*G09G 5/00* (2006.01)
*G02B 27/26* (2006.01)
(Continued)

(52) U.S. Cl.
CPC ........... *G02B 27/26* (2013.01); *G02B 5/3083* (2013.01); *G02B 27/2264* (2013.01); *G09G 3/003* (2013.01); *G09G 3/3648* (2013.01); *H04N 13/337* (2018.05); *H04N 13/341* (2018.05); *H04N 13/398* (2018.05); *G09G 2310/0218* (2013.01); *G09G 2310/0224* (2013.01);
(Continued)

(58) Field of Classification Search
CPC . H04N 13/0007; H04N 13/0048; H04N 13/04
USPC ........ 345/1.1–9, 32; 349/15; 348/42–48, 51; 353/7
See application file for complete search history.

(56) References Cited

U.S. PATENT DOCUMENTS

2005/0062846 A1  3/2005  Choi et al.
2010/0045780 A1*  2/2010  Kwon et al. .................... 348/51
(Continued)

FOREIGN PATENT DOCUMENTS

CN  1618237 A  5/2005
CN  102193239 A  9/2011

OTHER PUBLICATIONS

Office Action dated Jul. 2, 2014, issued by the State Intellectual Property Office of China in Chinese Patent Application No. 201210361663.7.

*Primary Examiner* — Ram A Mistry
(74) *Attorney, Agent, or Firm* — Morgan, Lewis & Bockius LLP

(57) ABSTRACT

A stereoscopic image display device and a method of driving the same are provided. The stereoscopic image display device includes: a display panel; a patterned retarder transmitting light from the display panel as first and second polarization components; a data driving circuit driving data lines of the display panel; a gate driving circuit driving gate lines of the display panel; a 3D formatter: separating input 3D image signal into first and second eye image data; and arranging the first and second eye image data according to a vertical k-divisional operation to generate an original frame; and a timing controller: dividing one frame into k sub-fields with time-divisional driving; and controlling the data driving circuit and the gate driving circuit such that: the first eye image data are displayed in odd-numbered sub-fields with spatial-divisional driving; and the second eye image data are displayed in even-numbered sub-fields with spatial-divisional driving.

20 Claims, 14 Drawing Sheets

(51) Int. Cl.
    *H04N 13/337*     (2018.01)
    *H04N 13/341*     (2018.01)
    *H04N 13/398*     (2018.01)
    *G02B 5/30*       (2006.01)
    *G02B 27/22*      (2018.01)
    *G09G 3/00*       (2006.01)
    *G09G 3/36*       (2006.01)

(52) U.S. Cl.
    CPC .............. *G09G 2320/0209* (2013.01); *G09G 2340/0435* (2013.01); *H04N 2213/002* (2013.01)

(56)        References Cited

U.S. PATENT DOCUMENTS

2010/0045782 A1*  2/2010  Morita .............................. 348/51
2011/0050850 A1*  3/2011  Yamada ......................... 348/43
2011/0090306 A1*  4/2011  Suh et al. ...................... 348/42
2011/0205344 A1*  8/2011  Lee ................... G02B 27/2264
                                                         348/56
2011/0216177 A1*  9/2011  Chae et al. ..................... 348/57
2011/0261034 A1* 10/2011  Tsuchida ............. G09G 3/3659
                                                         345/204
2011/0261877 A1  10/2011  Choi et al.
2012/0146994 A1*  6/2012  Jeong .................. H04N 13/398
                                                         345/419
2012/0257011 A1* 10/2012  Mengwasser .................. 348/43

* cited by examiner

STEREOSCOPIC IMAGE DISPLAY DEVICE USING SPATIAL-DIVISIONAL DRIVING AND METHOD OF DRIVING THE SAME

CROSS-REFERENCE TO RELATED APPLICATION(S)

This application claims the benefit under 35 U.S.C. § 119(a) of Korean Patent Application No. 10-2011-0129556, filed on Dec. 6, 2011, in the Korean Intellectual Property Office, the entire disclosure of which is incorporated by reference herein for all purposes.

BACKGROUND

1. Technical Field

The following description relates to a stereoscopic image display device and a method of driving the same, which capable of implementing a stereoscopic image (hereinafter, referred to as a "three-dimensional (3D) image").

2. Discussion of the Related Art

The stereoscopic image display device can selectively implement not only a two-dimensional (2D) image, but also a three-dimensional (3D) image aided by development of various contents and circuit technique. The stereoscopic image display device implements the 3D image using a stereoscopic technique or an autostereoscopic technique.

Generally, the stereoscopic technique, which uses a binocular disparity between left and right eyes of a viewer, includes a glass method and a non-glass method. In the non-glass method, an optical plate such as parallax barrier or a lenticular lens is placed in the front or rear of a display screen. The glass method implements the 3D image by displaying a left eye image and a right eye image of which polarization directions are different from each other on a display panel and viewing the left and right eye images through polarization glasses or liquid crystal shutter glasses.

The liquid crystal shutter glasses method implements the 3D image by alternately displaying a left eye image and a right eye image on the display panel in a unit of frame, and opening or closing a left eye shutter or a right eye shutter of the liquid crystal shutter glasses in synchronized with a displaying timing. The liquid crystal shutter glasses make the binocular disparity in time-divisional driving method by opening only the left eye shutter during an odd-numbered frame period when the left eye image is displayed and opening only the right eye shutter during an even-numbered frame period when the right eye image is displayed. In the liquid crystal shutter glasses method, a luminance of the 3D image is low because the data on time of the liquid crystal shutter glasses is short, and 3D crosstalk is generated according to synchronization of the display panel and the liquid crystal shutter glasses, and on/off changing response characteristic.

The polarization glasses method uses a patterned retarder 2 attached on a display panel 1 as shown in FIG. 1. The polarization glasses method can implement a 3D image by spatially dividing left eye image and right eye image. For this, the polarization glasses method alternately displays the left eye image data L and right eye image data R on the display panel 1 in a unit of a horizontal line, and switches light input to the polarization glasses 3 having left and right lenses via the patterned retarder 2.

The stereoscopic display device according to the polarization glasses method includes a 3D formatter for processing 3D image signal from an external video source device such that the 3D image signal may be appropriately displayed on the display panel. The 3D formatter generates display data to be displayed on the display panel by separating the 3D image signal from the video source device into left eye image data L and right eye image data R, and alternately arranging the separated left eye image data L and right eye image data R in a unit of one horizontal line as shown in FIG. 2. Herein, the 3D image is input from the video source device to the 3D formatter in side by side type, top and down type, line by line type, and so on.

If the display panel is driven with the same frequency as the input frame frequency (e.g., 60 Hz) of the 3D image signal, the stereoscopic display device according to the polarization glasses method may include only the 3D formatter as shown in FIG. 3A. However, if the display panel is driven with a frequency (e.g., 120 Hz, 240 Hz, etc.) faster than the input frame frequency (e.g., 60 Hz) of 3D image signal, the stereoscopic display device according to the polarization glasses method may include a frame rate control (FRC) processor as well as the 3D formatter as shown in FIG. 3B. The FRC processor twice-copies the data from the 3D formatter in a unit of one frame to generate a display data to be displayed on the display panel if the display panel is driven with a double-speed frame frequency (120 Hz) which is twice faster than the input frame frequency (60 Hz). The FRC processor also quarter-copies the data from the 3D formatter in one frame unit to generate a display data to be displayed if the display panel is driven with a quad-speed frame frequency (120 Hz) which is four times faster than the input frame frequency (60 Hz).

However, there are some problems in the related art stereoscopic display device according to the polarization glasses method.

First of all, the related art stereoscopic display device alternately displays the left eye image data L and the right eye image data R on the display panel in a unit of one horizontal line. According to the spatial-divisional type, a display luminance displayed on the display panel by the left eye image data L is affected by the right eye image data R which is displayed neighboring to the left eye image data L on the display panel. Also, a display luminance displayed on the display panel by the right eye image data R is affected by the left eye image data L which is displayed neighboring to the right eye image data R on the display panel. Thus, there is a luminance deviation between the left eye image data L due to the display luminance of the neighboring right eye image data R. Further, there is a luminance deviation between the right eye image data R due to the display luminance of the neighboring left eye image data L.

For example, if a left eye image data L1 and a right eye image data R1 neighbored to each other have a same luminance as shown in FIG. 4, the right eye image data R1 following the left eye image data L1 has a first luminance (relatively bright luminance) because a charge delay of the right eye image data R1 is small. On the other hand, if a left eye image data L2 and a right eye image data R2 neighbored to each other have a different luminance as shown in FIG. 4, the right eye image data R2 following the left eye image data L2 has a second luminance (relatively dark luminance) lower than the first luminance because the charge delay of the right eye image data R2 is large. In spite of the luminance of the right eye image data R1 being the same as the luminance of the right eye image data R2, they are different from each other due to the display luminance of the left eye image data L1 and L2 which are neighbored to the right eye image data R1 and R2, respectively. This pattern holds for left eye image data L3, L4, L5, L6, etc. and right eye image data R3, R4, R5, R6, etc.

The luminance deviation between the left eye image data L is caused by the right eye image data R which are neighbored thereto, and the luminance deviation between the right eye image data R is caused by the left eye image data L which are neighbored thereto. The luminance deviation by the interference of the left eye image data L and the right eye image data R is perceived by viewers as a 3D crosstalk. The 3D crosstalk increases in proportional to the speed of the frame frequency. That is, the 3D crosstalk increases when the stereoscopic image device is driven with the double-speed frame frequency (120 Hz) rather when the stereoscopic image device is driven with the input frame frequency (60 Hz). Similarly, the 3D crosstalk increases when the stereoscopic image device is driven with the quad-speed frame frequency (240 Hz) rather when the stereoscopic image device is driven with the double-speed frame frequency (120 Hz).

Secondly, if there is a difference between a frame rate of display image and a perceiving ability of eye, motion blurring or ghost phenomenon is caused to decrease display definition of the stereoscopic image device. To prevent the decrease of display definition, application of a motion estimation motion compensation (MEMC) technique to a 2D image is proposed. The MEMC technique inserts at least one interpolation frame between the input frames to reduce the difference between the frame rate of display image and the perceiving ability of eye.

To apply the MEMC technique, it is necessary for the left eye image data L and right eye image data R to be separated from each other without being mixed. According to the related art polarization glasses type stereoscopic image display, it is difficult to process the signal from the 3D formatter using the MEMC technique because the left eye image data L and the right eye image data R are mixed to each other in a unit of one horizontal line in one frame display data generated by the 3D formatter. To apply the MEMC technique to the related art polarization glasses type stereoscopic image display apply the MEMC technique, it is necessary to use a very complicated signal process procedure. That is, to apply the MEMC technique to the related art polarization glasses type stereoscopic image display before the display data is generated, it is necessary to insert an interpolation frame through the MEMC technique and generate the display data in line by line type. Furthermore, to apply the MEMC technique to the related art polarization glasses type stereoscopic image display after the display data is generated, it is necessary to re-separate the display data generated in line by line type into left eye image data and right eye image data, insert the interpolation frame through the MEMC technique, and then re-generate the display data in line by line type.

SUMMARY

Embodiments of the present invention relate to a stereoscopic image display device and a method of driving the same.

One object of embodiments is to provide a stereoscopic image display device and a method of driving the same, that reduces perception of three-dimensional (3D) crosstalk by removing interference between left eye image data and right eye image data.

Another object of embodiments is to provide a stereoscopic image display device and a method of driving the same, that is capable of implement a simple signal process procedure when MEMC technique is applied.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a stereoscopic image display device, including: a display panel, a patterned retarder configured to transmit light from the display panel as a first polarization component and a second polarization component, a data driving circuit configured to drive data lines of the display panel, a gate driving circuit configured to drive gate lines of the display panel, a three-dimensional (3D) formatter configured to: separate input 3D image signal into a first eye image data and a second eye image data, and arrange the first eye image data and second eye image data according to a vertical k-divisional operation to generate an original frame, where k is a positive even number, and a timing controller configured to: divide one frame into k sub-fields with time-divisional driving, and control the data driving circuit and the gate driving circuit such that: the first eye image data are displayed in odd-numbered sub-fields with spatial-divisional driving, and the second eye image data are displayed in even-numbered sub-fields with spatial-divisional driving.

In another aspect, there is provided a method of method of driving a stereoscopic image display device including a display panel, a patterned retarder that transmits light from the display panel as a first polarization component and a second polarization component, a data driving circuit that drives data lines of the display panel, and a gate driving circuit that drives gate lines of the display panel, the method including: separating an input three-dimensional (3D) image signal into a first eye image data and a second eye image data, arranging the first eye image data and second eye image data according to a vertical k-divisional driving operation to generate an original frame, where k is a positive even number, dividing one frame into k sub-fields with time-divisional driving, and controlling the data driving circuit and the gate driving circuit such that: the first eye image data are displayed in odd-numbered sub-fields with spatial-divisional driving, and the second eye image data are displayed in even-numbered sub-fields with spatial-divisional driving.

It is to be understood that both the foregoing general description and the following detailed description are examples and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
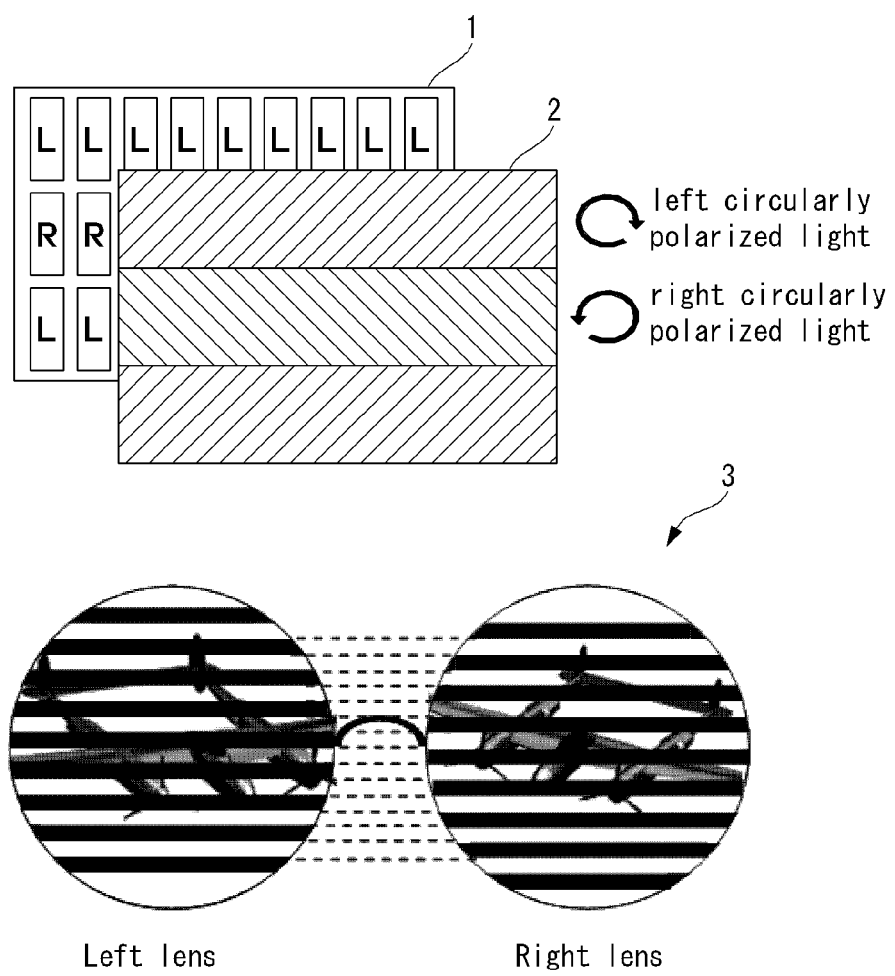
FIG. 1 is a schematic diagram illustrating a principle implementing a three-dimensional (3D) image according to a related art polarization glasses type stereoscopic image display device.
Figure 2:
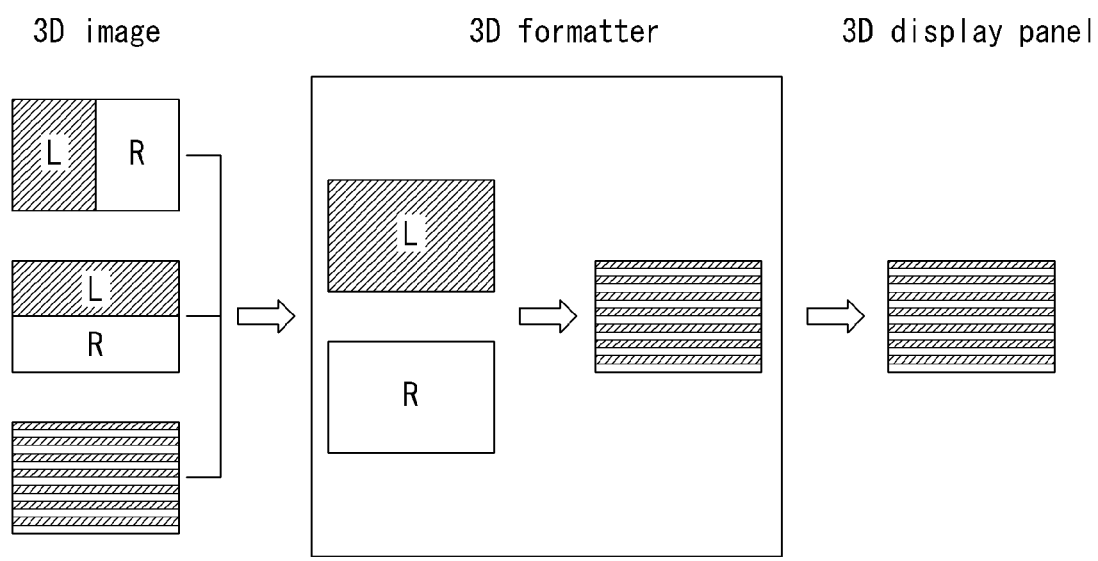
FIG. 2 is a block diagram illustrating an operation of a 3D formatter included in the related art polarization glasses type stereoscopic image display device.
Figure 3A:
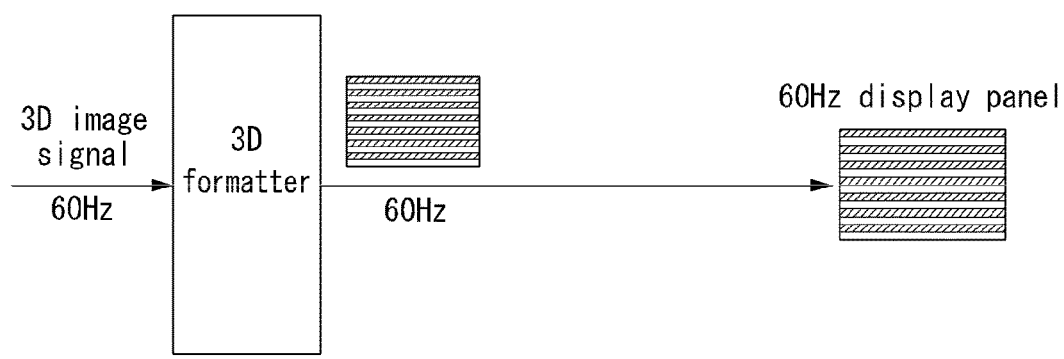
FIG. 3A is a block diagram illustrating a technical construction for processing a 3D image signal when a display panel is driven at the same frequency as the input frame frequency in the related art polarization glasses type stereoscopic image display device.
Figure 3B:
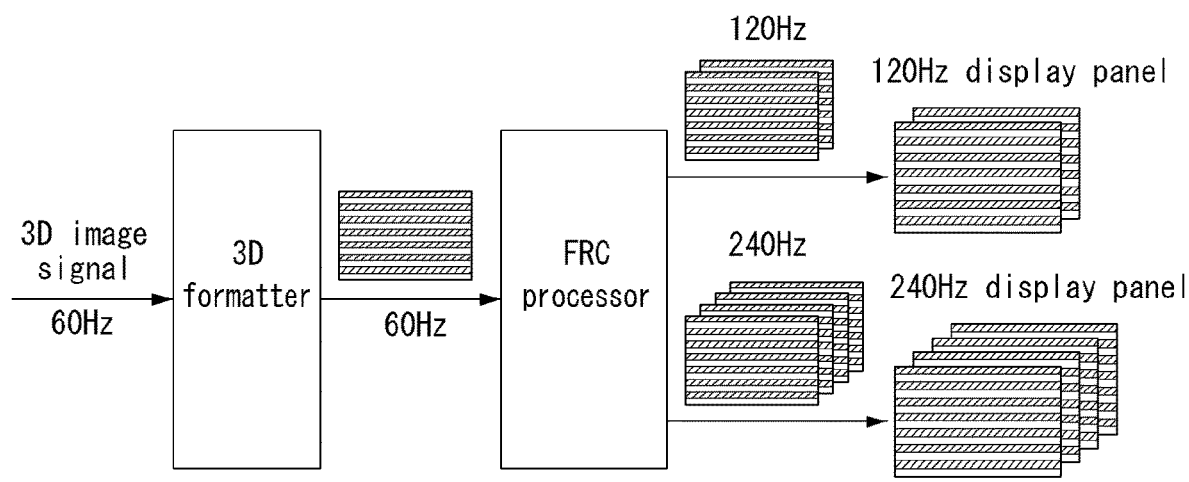
FIG. 3B is a block diagram illustrating another technical construction for processing a 3D image signal when the display panel is driven at a frequency faster than the input frame frequency in the related art polarization glasses type stereoscopic image display device.
Figure 4:
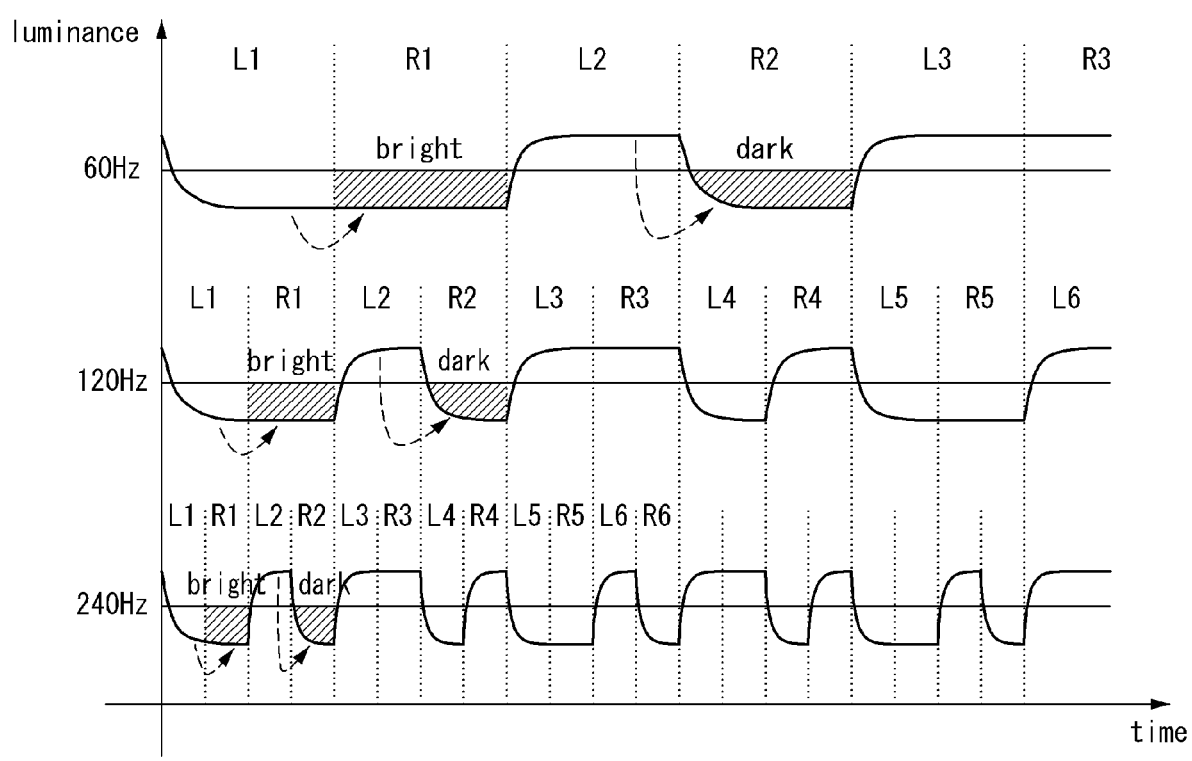
FIG. 4 is a timing chart explaining that 3D crosstalk is perceived in the related art due to luminance deviation caused by interference between left eye image data and right eye image.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Names of the respective elements used in the following explanations are selected only for convenience of writing the specification and may be thus different from those used in actual products.

Hereinafter, examples of various embodiments will be described in detail with reference to FIG. 5 to FIG. 14. Like reference numerals designate like elements throughout the specification of this disclosure.

The stereoscopic display device and the method of driving the same according to embodiments may separate an input three-dimensional (3D) image signal into first and second eye image data, e.g., the left eye image data and the right eye image data, and may arrange the separated left and right eye image data according to a vertical k-divisional (where k is a positive even number) operation to generate the original frame. Also, the display data of the original frame may be displayed on the display panel according to the time-divisional and spatial-divisional driving operations by controlling the operation of the display panel driving circuit. Accordingly, the 3D crosstalk may be prevented from being generated by removing interference between the left eye image data and right eye image data Furthermore, interpolation images may be easily produced because the stereoscopic display device of this disclosure may divide the original frame into the first (e.g., left) eye image data and second (e.g., right) eye image data which may be divided in time-divisional and spatial-divisional driving methods, and may perform the motion estimation motion compensation (MEMC) process for the original frame. Accordingly, a response speed of the 3D image may be considerably improved as implemented by the polarization glasses method.

Figure 5:
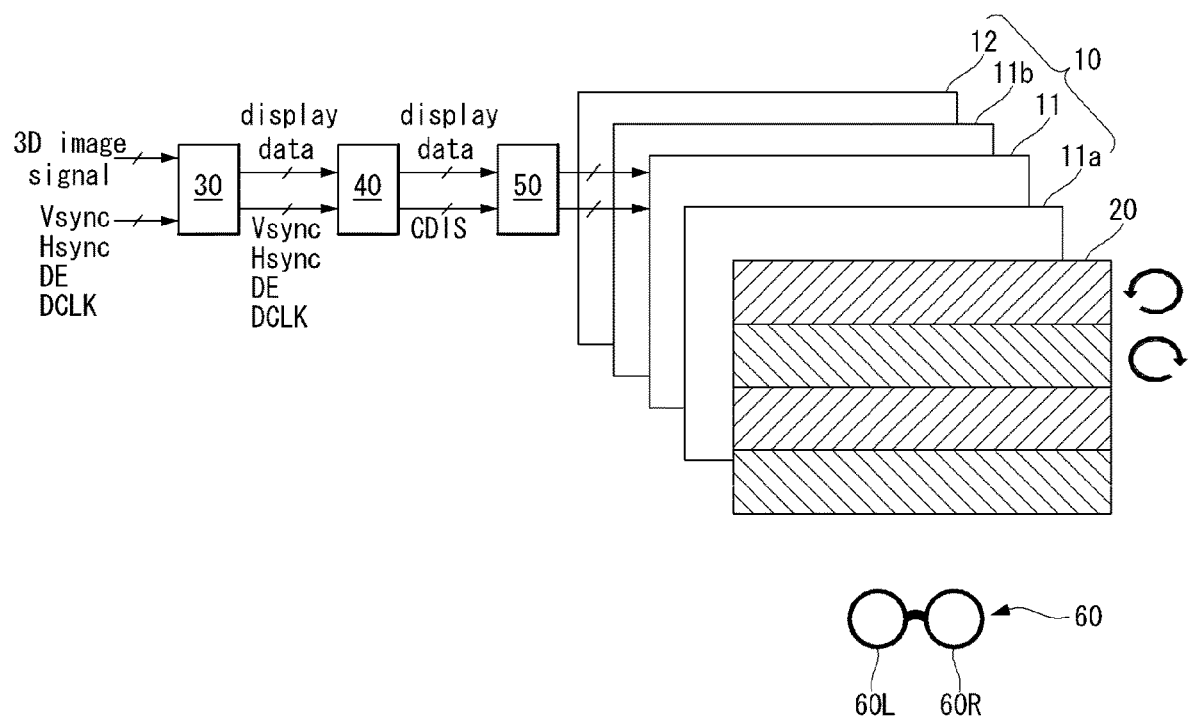
FIG. 5 is an example schematic block diagram illustrating a stereoscopic image display device according to an embodiment of this disclosure.
Figure 6:
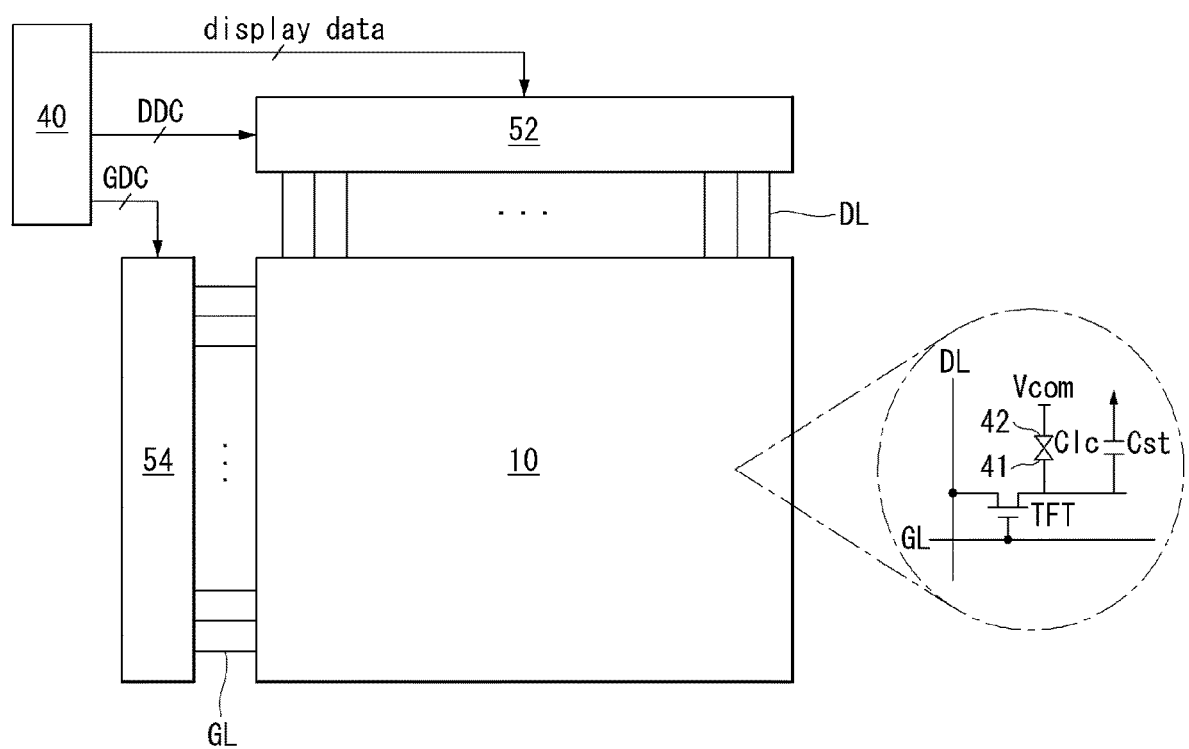
FIG. 6 is an example schematic block diagram illustrating a stereoscopic image display device according to an embodiment of this disclosure.

FIGS. 5 and 6 are schematic block diagrams illustrating a stereoscopic image display device according to an embodiment of this disclosure. As shown in FIGS. 5 and 6, the stereoscopic image display device may include a display panel device 10, a patterned retarder 20, a 3D processor 30, a timing controller 40, a display panel driving circuit 50 having a data driving circuit 52 and a gate driving circuit 54, and polarization glasses 20.

The display panel device 10 may be implemented, for example, as a flat panel display such as a liquid crystal display (LCD), a field emission display (FED), a plasma display panel (PDP) display, and an organic light emitting diode (OLED) display. In the following description, the liquid crystal display (LCD) is described as an example of the display panel device 10.

The display panel device 10 may include a display panel 11, an upper polarization film 11a attached on an upper surface of the display panel 11, and a lower polarization film 11b attached on a lower surface of the display panel 11.

The display panel 11 may include an upper glass substrate, a lower glass substrate, and a liquid crystal layer formed therebetween. On the lower glass substrate, a pixel array may be formed. The pixel array may include a plurality of data lines DL, a plurality of gate lines GL crossing over the plurality of data lines DL, thin film transistors TFT, pixel electrodes 41 of liquid cells Clc, and storage capacitors Cst which may be connected to the TFTs, respectively.

On the lower substrate, black matrices, color filters, and a common electrode 42, and so on, may be formed. The common electrode 42 may be formed on the upper glass substrate in a vertical electric field driving method such as a twisted nematic (TN) mode and a vertical alignment (VA) mode, and may be formed on the lower glass substrate with the pixel electrode 41 in a horizontal electrical field driving method, such as an in-plane switching (IPS) mode and a fringe field switching (FFS) mode.

On each of the upper and lower glass substrates, polarization plates of which optical axes are orthogonal to each other may be attached. On surfaces of the upper and lower glass substrates abutting on the liquid crystal layer, alignment films may be formed to set a pre-tilt angle of liquid crystal.

The display panel 11 may be implemented with any mode of the TN mode, the VA mode, the IPS mode, and the FFS mode. The display panel 11 may be implemented with any type of a transmissive type display panel, a reflective-transmissive type display panel, a reflective type display panel, and so on. The transmissive type display panel and the reflective-transmissive type display panel may use a backlight unit 12. The backlight unit 12 may be implemented, for example, with a direct type backlight unit or an edge type backlight unit.

The patterned retarder 20 may be attached to the upper polarization film 11a of the display panel 11. The patterned retarder 20 may have first retarder patterns formed on odd lines thereof and second retarder patterns formed on even lines thereof. The optical absorption axis of the first retarder pattern may be orthogonal to the optical absorption axis of the second retarder pattern. The patterned retarder 20 may switch light from the pixel array in a unit of pixel line. Herein, the pixel line may be extended along a horizontal direction in parallel with the gate line GL. For this, the first retarder pattern of the patterned retarder 20 may face to odd-numbered pixel lines of the pixel array to transmit a first polarized light (e.g., left circularly polarized light) of light input from the pixel array and may cut-off a second polarized light (e.g., right circularly polarized light) of the light input from the pixel array. The first retarder pattern of the patterned retarder 20 may be implemented with a polarization filter for transmitting the left circularly polarized light, and the second retarder pattern of the patterned retarder 20 may be implemented with another polarization filter for transmitting the right circularly polarized light. It should be appreciated that left and right may be switched, as appropriate.

Figure 7:
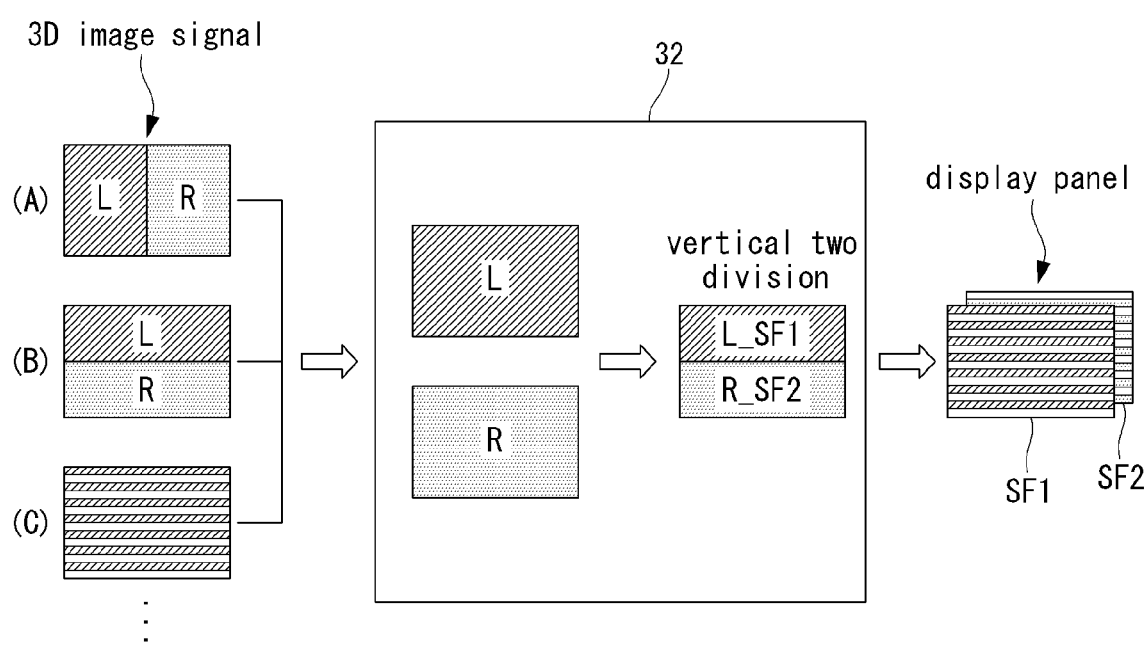
FIG. 7 is an example block diagram illustrating an example of a 3D processor shown in FIG. 5.
Figure 10:
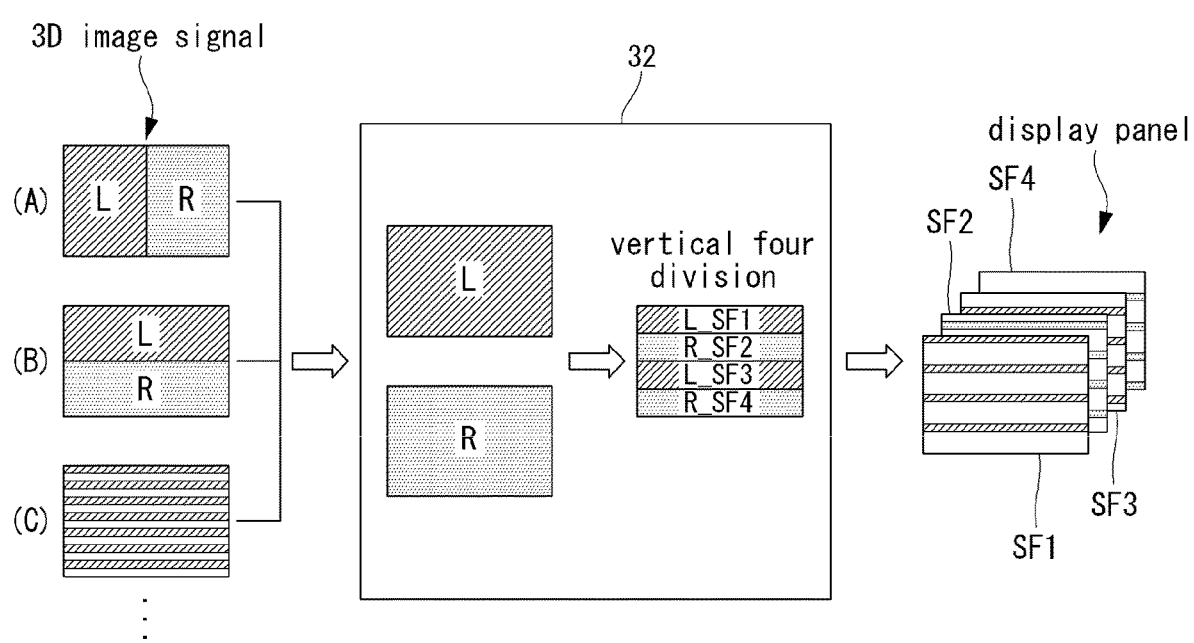
FIG. 10 is an example block diagram illustrating another example of the 3D processor shown in FIG. 5.

With reference to FIGS. 7 and 10, the 3D processor 30 including a 3D formatter 32 may separate an input 3D image signal into a left eye image data and a right eye image data, may arrange the separated left eye image data and right eye image data according to a vertical k divisional driving method (where k is a positive even number) for a timing-divisional and spatial-divisional driving, and may generate an original frame to be supplied to the display panel 11. Herein, k may be equal to the number of sub-field for the timing-divisional and spatial-divisional driving. The left eye image data of the display data constituting the original frame may be aligned to be displayed on odd-numbered sub-fields, and the right eye image data of the display data constituting the original frame may be aligned to be displayed on even-numbered sub-fields. The left eye image data displayed on the odd-numbered sub-fields and the right eye image data displayed on the even-numbered sub-fields may be spatially separated. Also, the left eye image data displayed on the odd-numbered sub-fields are spatially separated from each other, and the right eye image data displayed on the even-numbered sub-fields may be spatially separated from each other.

Figure 13:
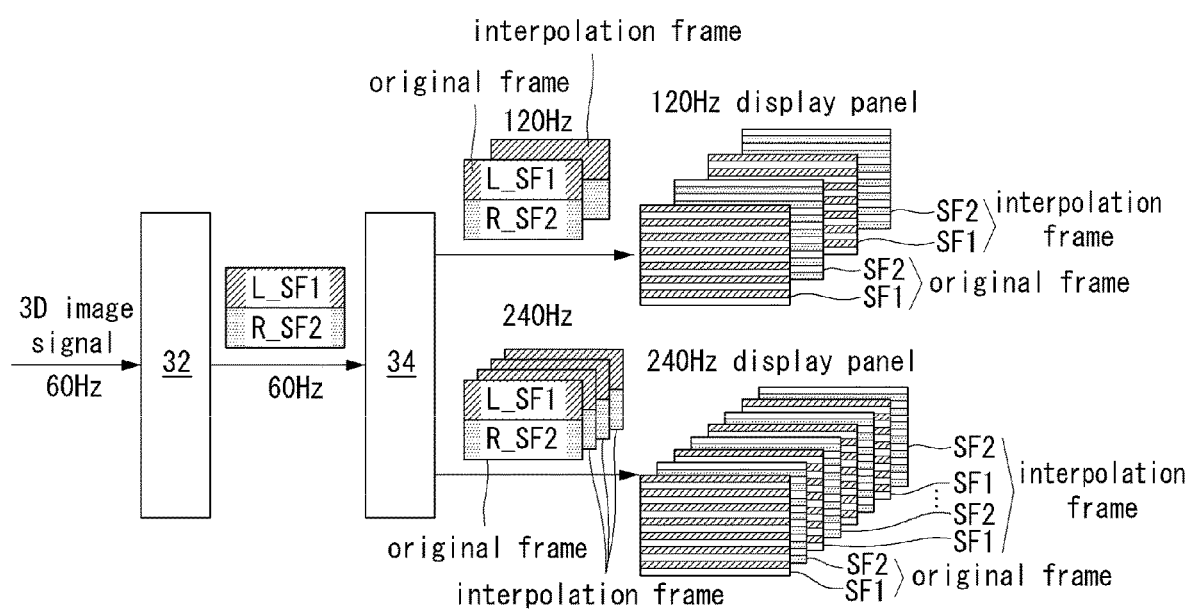
FIG. 13 an example block diagram illustrating another example of the 3D processor shown in FIG. 5.

With reference to FIG. 13, the 3D processor 30 may include a 3D formatter 32 which may separate an input 3D image signal into a left eye image data and a right eye image data, may arrange the separated left eye image data and right eye image data according to a vertical k divisional driving method for a timing-divisional and spatial-divisional driving, and may generate an original frame to be supplied to the display panel 11 as shown FIG. 13. The 3D processor 30 may further include a data interpolator 34 which may insert at least one interpolation frame between the original frames input from the 3D formatter 32 to increase the frame rate.

Also, the 3D processor 30 may supply timing signals such as a vertical synchronization signal Vsync, a horizontal synchronization signal Hsync, a data enable signal DE, a dot clock signal DCLK input from a system board (not shown) to the timing controller 40.

The timing controller 40 may control an operation of the display panel driving circuit 50 such that the display data input from the 3D processor 30 may be displayed on the display panel 11 according to the timing-divisional and spatial-divisional driving method.

The timing controller 40 may receive the original frame (or the original and interpolated frames), may timing-divide and spatial-divide each of left eye image data and right eye image data of the display data constituting the original frame (or the original and interpolated frames) to be corresponding to the sub-field, and may supply the divided left and right eye image data to the data driving circuit 52.

The timing controller 40 may receive the timing signals such as the vertical synchronization signal Vsync, the horizontal synchronization signal Hsync, the data enable signal DE, and the dot clock signal DCLK through the 3D processor; and may generate control signal CDIS for controlling operation. The control signal CDIS may include a data control signal DDC and a gate control signal GDC. The timing controller 40 may control the display panel driving circuit 50 with a frame frequency of N×f Hz (where N is a positive number equal to or more than two, and f is the input frame frequency) by multiplying the timing signals Vsync, Hsync, DE, and DCLK synchronized with the input frame frequency. The input frame frequency may be about 60 Hz in a NTSC (National Television Standards Committee) system, and about 50 Hz in a PAL (Phase-Alternating Line) system. Hereinafter, embodiments will be described based on the NTST system, the PAL system may be applied to this disclosure with appropriate changes as should be understood by one skilled in the art.

The display panel driving circuit 50 may include a data driving circuit 52 for driving the data lines DL of the display panel 11 and a gate driving circuit 54 for driving the gate lines of the display panel 11.

Each of the source driving ICs of the data driving circuit 52 may include shift registers, latches, digital to analog converters (DACs), output buffers, and so on. The data driving circuit 52 may latch a left eye image data and a right eye image data separated in a unit of a subfield according to the data control signal DDC. The data driving circuit 52 may reverse a polarity of the data voltage by converting the left eye image data (or right eye image data) into an analog positive polarity gamma compensating voltage and an analog negative polarity gamma compensating voltage in response to a polarization control signal. The data driving circuit 52 may output the data voltage to the data lines DL in synchronized with scan pulses output from the gate driving circuit 54. The source driving ICs of the data driving circuit 52 may be mounted on a tape carrier package (TCP), and the TCP may be joined with the lower glass substrate of the display panel 11 by a tape automated bonding (TAB) process.

Figure 8:
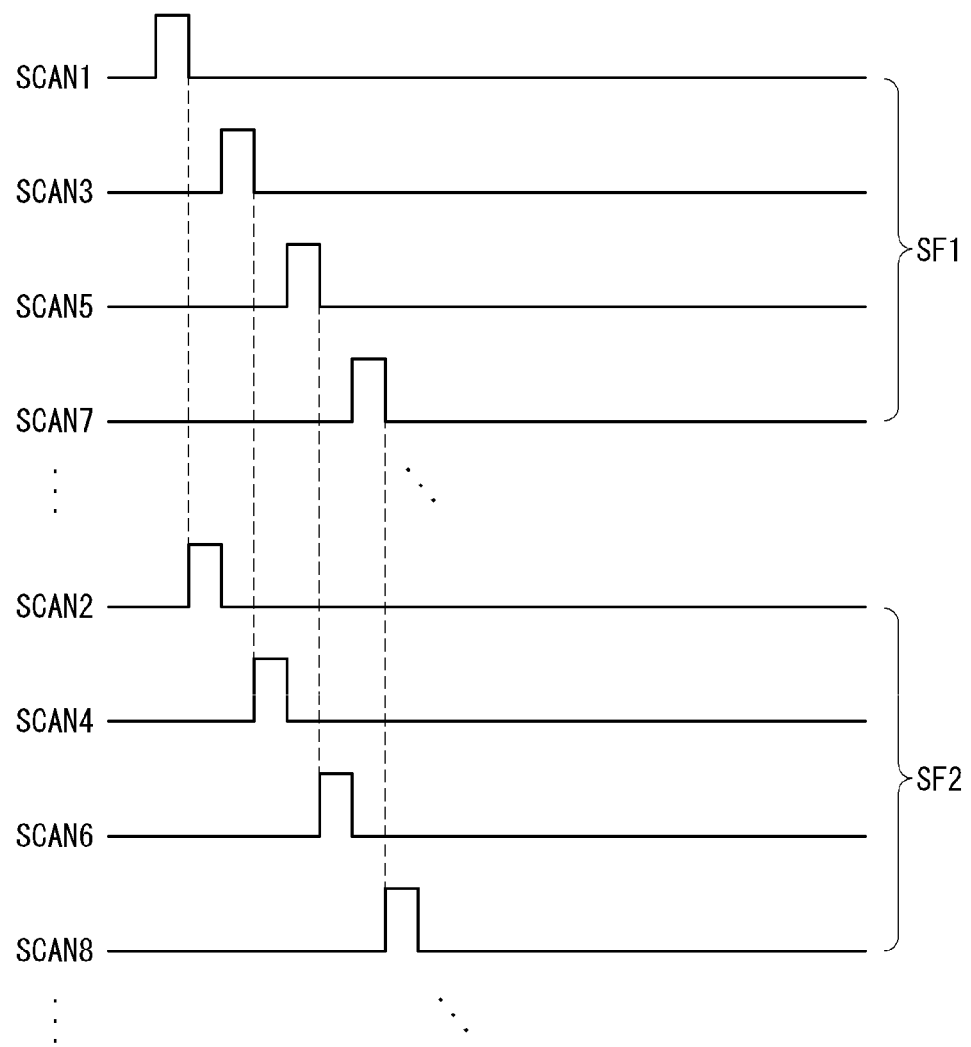
FIG. 8 is an example timing chart illustrating a driving timing of scan pulses generated to be synchronized with a operation of the 3D processor shown in FIG. 7.
Figure 11:
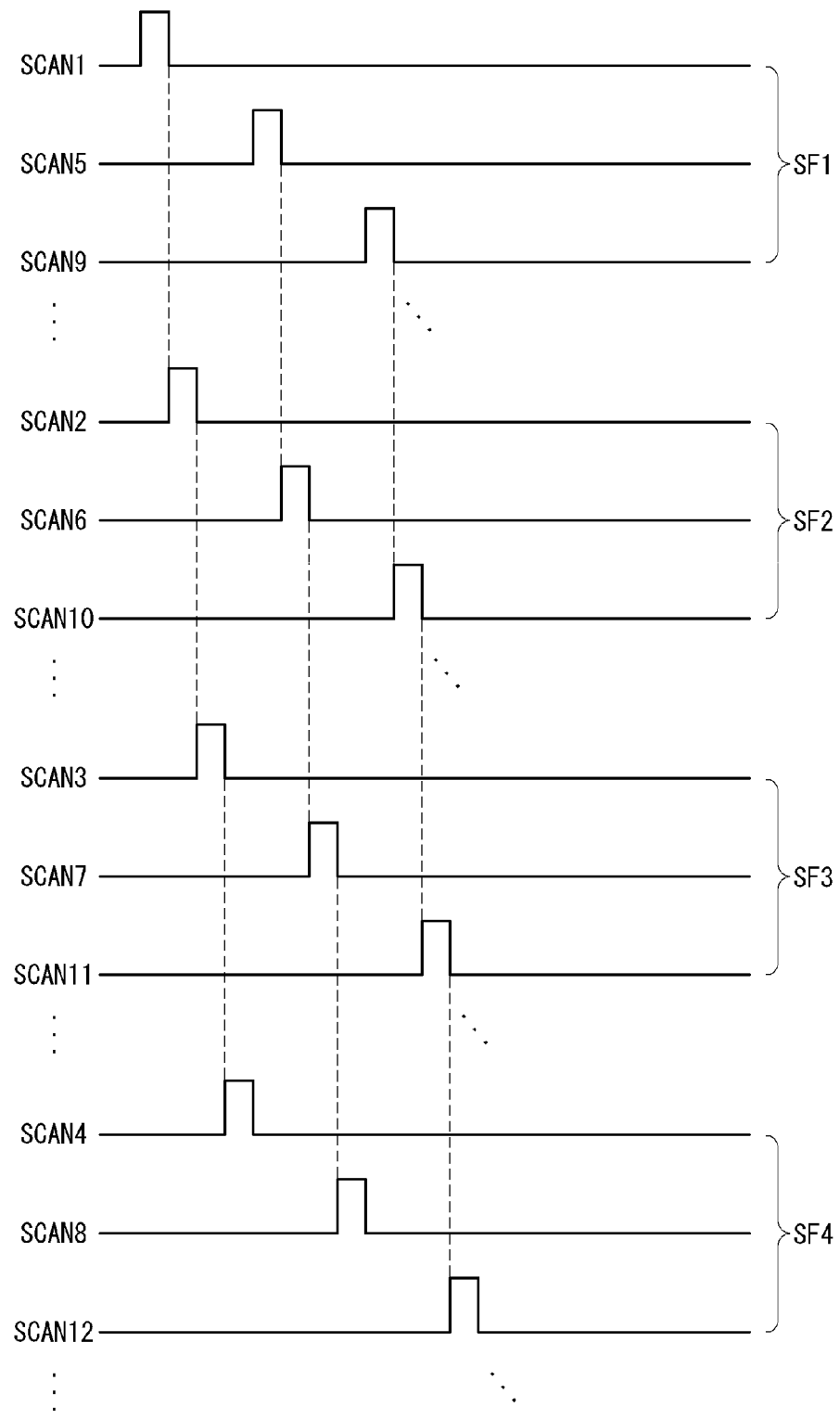
FIG. 11 is an example timing chart illustrating a driving timing of scan pulses generated to be synchronized with a operation of the 3D processor shown in FIG. 10.

The gate driving circuit 54 may include shift registers, multiplexer array, level shifters, and so on. The gate driving circuit 54 may supply the scan pulses to the gate lines GL according to the gate control signal GDC. At this time, the gate driving circuit 54 may change the sequence of the scan pulses to be supplied according to the sub-fields such that the left eye image data and the right eye image data may be displayed in a state separated in time and spatial. In an example in which one frame includes two sub-fields as shown in FIG. 8, the gate driving circuit 54 may sequentially generate odd-numbered scan pulses in a first sub-field and may supply them to the odd-numbered gate lines. Subsequently, the gate driving circuit 54 may sequentially generate even-numbered scan pulses in a second sub-field and supply them to the even-numbered gate lines. In an example in which one frame includes four sub-fields as shown in FIG. 11, the gate driving circuit 54 may sequentially generate $(4n-3)^{th}$ scan pulses (n is a positive integer) in a first sub-field and may supply them to the $(4n-3)^{th}$ gate lines. The gate driving circuit 54 may sequentially generate $(4n-2)^{th}$ scan pulses in a second sub-field and may supply them to the $(4n-2)^{th}$ gate lines. The gate driving circuit 54 may sequentially generate $(4n-1)^{th}$ scan pulses in a third sub-field and may supply them to the $(4n-1)^{th}$ gate lines. The gate driving circuit 54 may sequentially generate $(4n)^{th}$ scan pulses in a fourth sub-field and may supply them to the $(4n)^{th}$ gate lines. The shift register of the gate driving circuit 54 may be mounted on a tape carrier package (TCP), the TCP may be joined with the lower glass substrate of the display panel 11 by a tape automated bonding (TAB) process. Alternatively, the gate driving circuit 54 may be directly formed on the lower glass substrate with the pixel array by the gate in panel (GIP) process.

The polarization glasses 60 may include a left eye glass 60L having a left eye polarization filter (or a first polarization filter) and a right eye glass 60R having a right eye polarization filter (or a second polarization filter). The left polarization filter may have an optical absorption axis that is the same as the first retarder pattern of the patterned retarder 20, and the right polarization filter may have an optical absorption axis that is the same as the second retarder pattern of the patterned retarder 20. For example, the left eye polarization filter of the polarization glasses 60 may be selected as a left circularly polarized light filter, and the right eye polarization filter of the polarization glasses 60 may be selected as a right circularly polarized light filter. Through the polarization glasses 60, the user may view the left eye and right eye image data which may be displayed on the display device 10 in the timing-divisional and spatial-divisional driving method.

Figure 9:
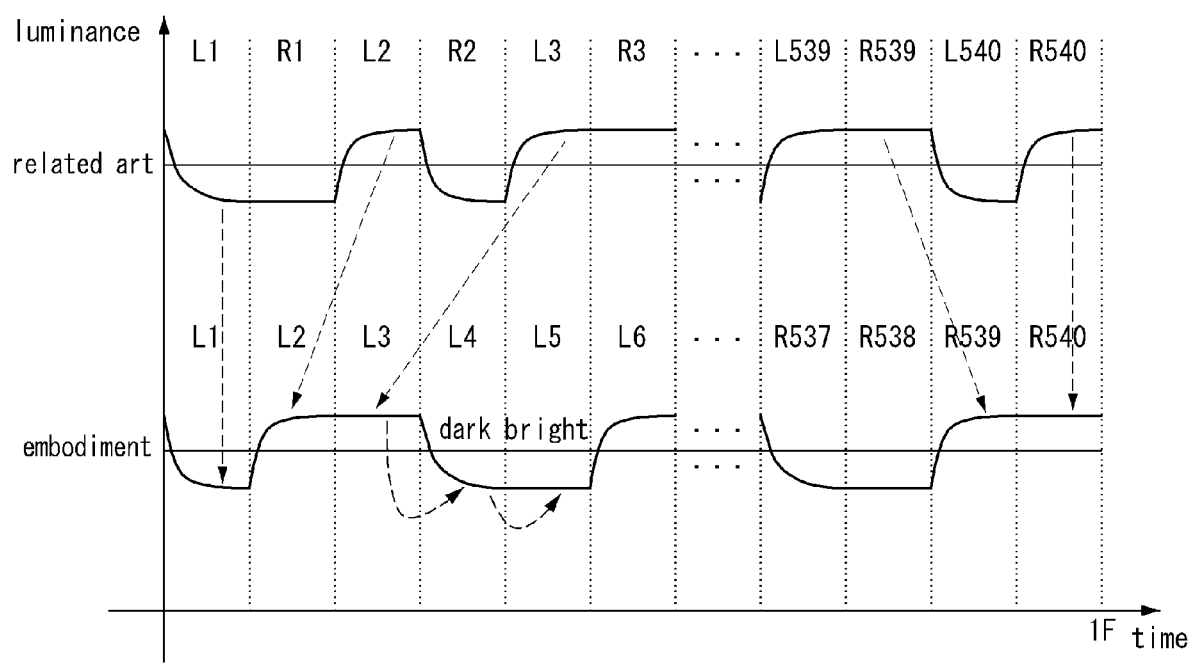
FIG. 9 is an example timing diagram illustrating a process of removing a 3D crosstalk.

FIG. 7 illustrates an example of the 3D processor 30 shown in FIG. 5. FIG. 8 illustrates example driving timings of scan pulses generated to be synchronized to the operation of the 3D processor 30. FIG. 9 shows example processes for removing 3D crosstalk.

With reference to FIG. 7, a 3D processor 30 according to a first example of this disclosure may include a 3D formatter 32 which may divide the input 3D image signal in vertical two division to generate left eye image data L_SF1 to be displayed on the first sub-fields SF1 (odd sub-fields) and right eye image data R_SF2 to be displayed on the second sub-fields SF2 (even sub-fields).

The 3D formatter 32 may separate the 3D image signal input from the system board in a form, such as side by side type, top and down type, or line by line type, to generate left eye image data L and right eye image data R; and may align the separated right and left eye image data L and R according the vertical two division method for time-divisional and spatial-divisional driving methods.

In an embodiment of this disclosure, the display panel driving circuit 50 may be controlled such that the display data of the original frame aligned by the 3D formatter 32 is displayed on the display panel 11, according to the time-divisional driving and spatial-divisional driving methods.

The gate driving circuit 54 may sequentially generate odd-numbered scan pulses SCAN1, SCAN3, SCAN5, SCAN7, . . . in the first sub-field SF1, may supply them to the odd-numbered gate lines in the first sub-field, and then may sequentially generate even-numbered scan pulses SCAN2, SCAN4, SCAN6, SCAN8, . . . in the second sub-field SF2, and may supply them to the even-numbered gate lines as shown in FIG. 8. The data driving circuit 52 may supply the left eye image data L_SF1 to the data lines according to the supply sequence of the odd-numbered scan pulses SCAN1, SCAN3, SCAN5, SCAN7, . . . in the first sub-field SF1, and may supply the right eye image data R_SF2 to the data lines according to the supply sequence of the even-numbered scan pulses SCAN2, SCAN4, SCAN6, SCAN8, . . . in the second sub-field SF2. As a result, the left eye image data L_SF1 may be displayed on the odd-numbered pixel lines of the display panel during the first sub-field SF1, and the right eye image data R_SF2 may be displayed on the even-numbered pixel lines of the display panel during the second sub-field SF2.

FIG. 9 shows the data displayed for one frame in an embodiment compared to the related art in an example in which there are 1080 pixel lines in the display panel 11.

With reference to FIG. 9, in the related art, the left eye image data L1 to L540 and the right eye image data R1 to R540 are alternately displayed on the display panel 11 in a unit of one horizontal line according to the spatial-divisional driving method. As a result, there are interference between the left eye image data and the right eye image data displayed on the display panel in a vertically neighborhood. Due to the luminance disparity by the interference, user can perceive luminance disparity as 3D crosstalk.

On the contrary, the stereoscopic display device according to an embodiment of this disclosure, as shown in the examples of FIGS. 7 and 8, may divide one frame into the first sub-field SF1 and the second sub-field SF2, may display all of the left eye image data L1 to L540 on the odd-numbered pixel lines of the display panel 11 in the first sub-field SF1, and then may display all of the right eye image data R1 to R540 on the even-numbered pixel lines of the display panel 11 in the second sub-field SF2. Accordingly, the display timing of the left eye image data L1 to L540 and the right eye image data R1 to R540 may be divided in a time-divisional driving method, and at the same time, the display position of the left eye image data L1 to L540 and the right eye image data R1 to R540 are divided in a spatial-divisional driving method. In embodiments, there may be luminance disparity due to interference between the left eye image data displayed on the display panel in a vertically neighborhood or between the right eye image data displayed on the display panel in a vertically neighborhood. However, the luminance disparity according to embodiments may be generated because of interaction between the image data having a same attribute (that is, interaction between the left eye image data displayed on the display panel in a vertically neighborhood or between the right eye image data displayed on the display panel in a vertically neighborhood). Thus, the luminance disparity may not be perceived as 3D crosstalk, because the 3D crosstalk is a phenomenon perceived when the left eye image data are mixed into the right eye image data, or the right eye image data are mixed into the left eye image data.

The stereoscopic display device may be expanded to that it may divide one frame into k sub-fields, may display left eye image data for k/2 odd-numbered sub-fields using the time-divisional and spatial-dividing driving methods, and may display right eye image data for k/2 even-numbered sub-fields using the time-divisional and spatial-dividing driving methods. Examples of the expanded stereoscopic display device will be described with reference to FIGS. 10 to 12.

Figure 12:
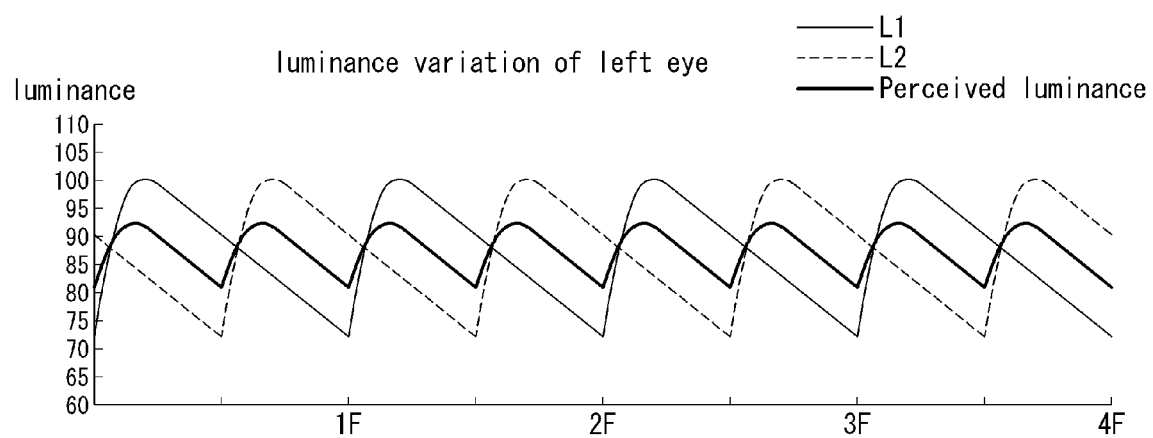
FIG. 12 is an example graph illustrating a process of removing flicker.
Figure 12:
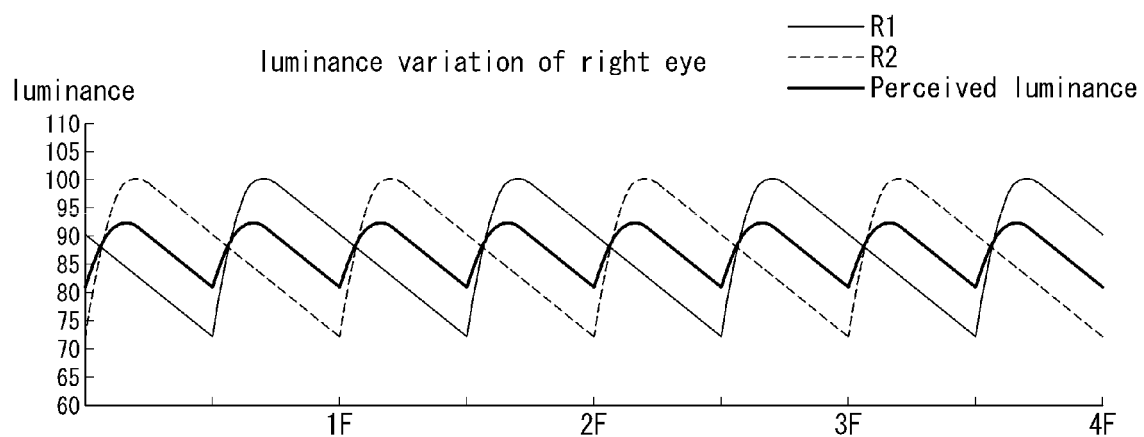

FIG. 10 is an example diagram illustrating another example of the 3D processor 30 shown in the FIG. 5 example. FIG. 11 is an example timing chart illustrating a driving timing of scan pulses generated to be synchronized with an operation of the 3D processor shown in FIG. 10. FIG. 12 is an example diagram illustrating a principle of removing flicker.

With reference to FIG. 10, the 3D processor 30 according to another embodiment of this disclosure may include a 3D formatter 32 which may divide the input 3D image signal in vertical two division to generate left eye image data L_SF1 to be displayed on the first sub-fields SF1, right eye image data R_SF2 to be displayed on the second sub-fields SF2, left eye image data L_SF3 to be displayed on the third sub-fields SF3, and right eye image data R_SF4 to be displayed on the fourth sub-fields SF4.

The 3D formatter 32 may separate the 3D image signal input from the system board in a form, such as side by side type, top and down type, line by line type, to generate left eye image data L and right eye image data R, and may align the separated right and left eye image data L and R according to the vertical four division method for time-divisional driving and spatial-divisional driving methods.

In an embodiment of this disclosure, the display panel driving circuit may be controlled such that the display data of the original frame aligned by the 3D formatter 32 may be displayed on the display panel 11 according to the time-divisional and spatial-divisional driving methods. The gate driving circuit 54 may sequentially generate $(4n-3)^{th}$ scan pulses SCAN1, SCAN5, SCAN9, . . . in the first sub-field SF1, may supply them to the $(4n-3)^{th}$ gate lines in the first sub-field, may sequentially generate $(4n-2)^{th}$ scan pulses SCAN2, SCAN6, SCAN10, . . . in the second sub-field SF2, may supply them to the $(4n-2)^{th}$ gate lines, may sequentially generate $(4n-1)^{th}$ scan pulses SCAN3, SCAN7, SCAN11, . . . in the third sub-field SF3, may supply them to the $(4n-1)^{th}$ gate lines, may sequentially generate $(4n)^{th}$ scan pulses SCAN4, SCAN8, SCAN12, . . . in the fourth sub-field SF4, and may supply them to the $(4n)^{th}$ gate lines as shown in FIG. 11.

The data driving circuit 52 may supply the left eye image data L_SF1 to the data lines according to the supply sequence of the (4n-3) scan pulses SCAN1, SCAN5, SCAN9, . . . in the first sub-field SF1, and may supply the right eye image data R_SF2 to the data lines according to the supply sequence of the even-numbered scan pulses SCAN2, SCAN6, SCAN10, . . . in the second sub-field SF2. Subsequently, the data driving circuit 52 may supply the left eye image data L_SF3 to the data lines according to the supply sequence of the (4n-1) scan pulses SCAN3, SCAN7, SCAN11, . . . in the third sub-field SF3, and may supply the right eye image data R_SF4 to the data lines according to the supply sequence of the $(4n)^{th}$ scan pulses SCAN4, SCAN8, SCAN12, . . . in the fourth sub-field SF4. As a result, the left eye image data L_SF1 may be displayed on the $(4n-3)^{th}$ pixel lines of the display panel 11 during the first sub-field SF1, the right eye image data R_SF2 may be displayed on the $(4n-2)^{th}$ pixel lines of the display panel 11 during the second sub-field SF2, the left eye image data L_SF3 may be displayed on the $(4n-2)^{th}$ pixel lines of the display panel 11 during the third sub-field SF3, and the right eye image data R_SF4 may be displayed on the $(4n)^{th}$ pixel lines of the display panel during the second sub-field SF4.

The stereoscopic image display device according to an embodiment of this disclosure may remove the 3D crosstalk by the process described in connection with the example in FIG. 9. Furthermore, the stereoscopic image display device according to an embodiment of this disclosure may obtain an additional effect capable of removing flicker as shown in FIG. 12. With reference to FIG. 12, the number of the sub-fields assigned in one frame in the stereoscopic image display device according to another embodiment of this disclosure may be twice as many as the stereoscopic image display device in other examples. As such, when the number of the sub-field increase, the number of the sub-fields for displaying the left eye image data and right eye image data also may be doubled, respectively. As a result, a change period of a perceived luminance for the left eye image may be reduced to one half frame by integration effect of visual luminance in two sub-fields for the left eye display. Similarly, a change period of a perceived luminance for the right eye image may be reduced to one half frame by integration effect of visual luminance in two sub-fields for the right eye display. The smaller the change period of the perceived luminance is, the less the user perceive flicker phenomenon. In FIG. 12, reference symbols L1 and L2 indicate left eye image data displayed in the first and third sub-fields, respectively, and reference symbols R1 and R2 indicate right eye image data displayed in the second and fourth sub-fields, respectively.

Figure 14:
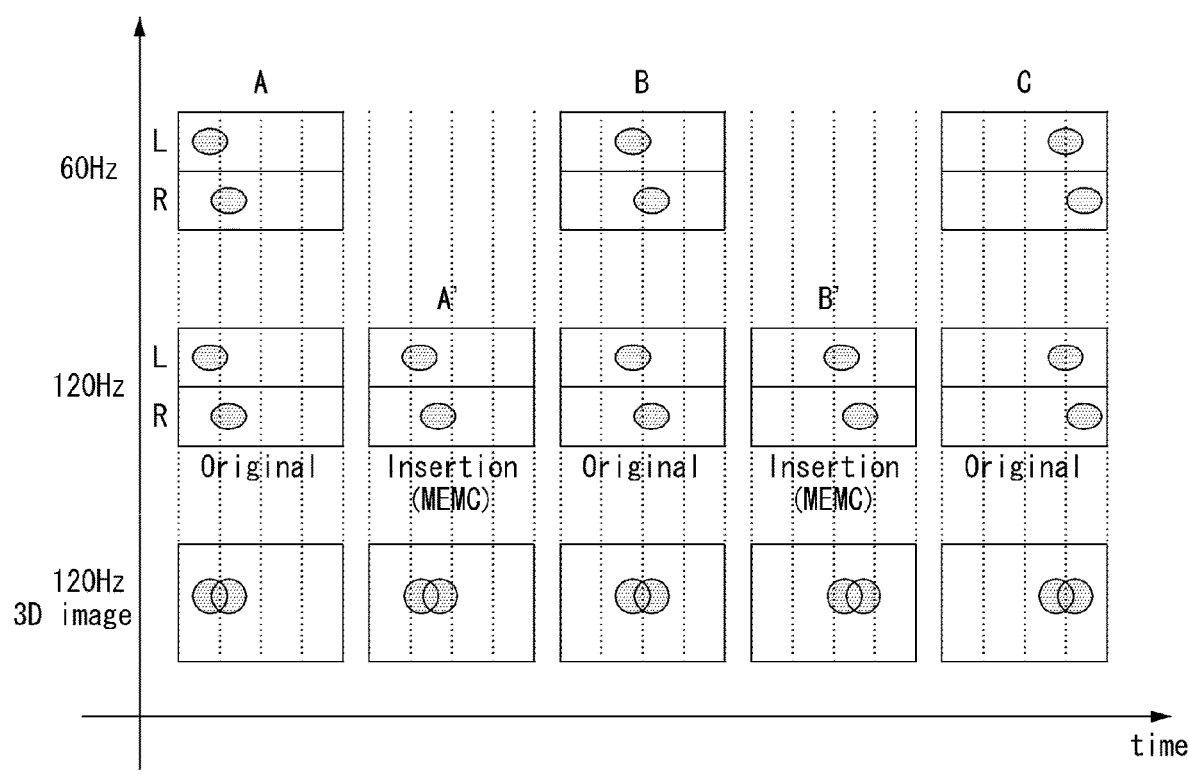
FIG. 14 is an example graph illustrating an operation of a data interpolator shown in FIG. 13.

FIG. 13 is an example a diagram illustrating another example of the 3D processor 30 shown in FIG. 5. FIG. 14 is an example diagram illustrating an operation of the data interpolator 34 shown in FIG. 13.

With reference to FIG. 13, the 3D processor 30 according to an embodiment of this disclosure may include a 3D formatter 32 and a data interpolator 34. The 3D formatter 32 may divide an input 3D image signal in vertical k division to generate left eye and right image data to be displayed in the k sub-fields, generating the original frame. The data interpolator 34 may insert at least one interpolation frame between the original frames to increase the frame rate.

FIG. 13 shows that the original frames output from the 3D formatter 32 may correspond to the FIG. 5 example, but embodiments are not limited thereto. It should be understood that the 3D formatter 32 of FIG. 13 may output k divisional original frames as well as the four divisional original frames described in connection with FIGS. 10 to 12.

The data interpolator 34 may increase the frame rate to 120 Hz by inserting one interpolation frame A' between the original frames A and B, and one interpolation frame B' between the original frames B and C, input at 60 Hz from the 3D formatter 32 as shown in FIG. 14. The data interpolator 34 may increase the frame rate to 240 Hz by inserting three interpolation frames between each of the original frames input at 60 Hz from the 3D formatter 32.

Among display data constituting the original frame, the left eye image data L_SF1 may be assigned to be displayed on the odd-numbered sub-field(s) for the original, and the right eye image data R_SF2 may be assigned to be displayed on the even-numbered sub-field(s) for the original. Also, among display data constituting the interpolation frame, the left eye image data L_SF1 may be assigned to be displayed on the odd-numbered sub-field(s) for the interpolation, and the right eye image data R_SF2 may be assigned to be displayed on the even-numbered sub-field(s) for the interpolation.

As may be understood from FIG. 14, the original frame input from the 3D formatter 32 may be completely divided into left eye image data and right eye image data which may be divided in time-divisional and spatial-divisional. Thus, the data interpolator 34 may perform the MEMC process by using the left eye image data and the right eye image data divided by the 3D formatter 32. According to this disclosure, signal process may be more simply implemented when the MEMC technique is applied because the interpolation frames may be simply inserted between the original frames. Also, response speed of a 3D image may be significantly increased implemented by polarization glasses method because the interpolation frames may be more easily made.

As mentioned above, the stereoscopic display device and the method of driving the same according to embodiments may separate an input 3D image signals into the left eye image data and the right eye image data, and may arrange the separated left and right eye image data according to the vertical k (where k is a positive even number) divisional method to generate the original frame. Also, the display data of the original frame may be displayed on the display panel according to the time-divisional and spatial-divisional driving methods by controlling the operation of the display panel driving circuit. Accordingly, 3D crosstalk may be prevented from being generated by removing interference between the left eye image data and right eye image data Furthermore, interpolation images may be easily produced because the stereoscopic display device of embodiments may divide the original frame into the left eye image data and right eye image data which may be divided in time-divisional and spatial-divisional driving methods, and may perform the MEMC process for the original frame. Accordingly, response speed of the 3D image may be considerably improved by the polarization glasses method.

It will be apparent to those skilled in the art that various modifications and variations can be made in embodiments of the present invention without departing from the spirit or scope of the invention. Thus, it is intended that the present invention cover the modifications and variations of this invention provided they come within the scope of the appended claims and their equivalents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A stereoscopic image display device, comprising:
a display panel including a plurality of pixels arranged in odd-numbered pixel lines and even-numbered pixel lines;
a patterned retarder configured to transmit light from the display panel as a first polarization component and a second polarization component;
a data driving circuit configured to drive data lines of the display panel;
a gate driving circuit configured to drive gate lines of the display panel, the gate lines including a plurality of odd-numbered gate lines and a plurality of even numbered gate lines;
a three-dimensional (3D) formatter configured to:
receive a frame of input 3D image data having a first eye image data and a second eye image data alternately arranged;
separate the frame of input 3D image data into the first eye image data and the second eye image data; and
arrange the separated first eye image data and second eye image data according to a vertical k-divisional operation to generate a top and down type original frame, where k is a positive even number, the top and down type original frame comprising:
the first eye image data arranged in a first set of contiguous lines; and
the second eye image data arranged in a second set of contiguous lines, the second set of contiguous lines beginning immediately subsequently to the first set of contiguous lines; and
a timing controller configured to:
receive timing signals at an input frame frequency f from a 3D processor;
divide the top and down type original frame from the 3D formatter directly into k sub-fields with time-divisional driving so that each odd-numbered sub-field has at least a portion of the arranged first eye image data and each even-numbered sub-field has at least a portion of the arranged second eye image data; and
control the data driving circuit and the gate driving circuit at a frame frequency N×f based on the k sub-fields, where N is a positive number equal to or greater than 2, such that:
at a first time period in one frame, the gate driving circuit sequentially supplies odd-numbered scan pulses respectively to the odd-numbered gate lines only in a first sub-field to display the arranged first eye image data in the first sub-field on the odd-numbered pixel lines of the display panel in the first sub-field only, without supplying any scan pulse to any of the even-numbered gate lines; and
then, at a second time period in the one frame and subsequent to the first time period, the gate driving circuit sequentially supplies even-numbered scan pulses respectively to the even-numbered gate lines only in a second sub-field to display the arranged second eye image data in the second sub-field on the even-numbered pixel lines of the display panel in the second sub-field only, without supplying any scan pulse to any of the odd-numbered gate lines.

2. The stereoscopic image display device of claim 1, wherein:
the first eye image data of the top and down type original frame is aligned to be displayed in at least one odd-numbered sub-field; and
the second eye image data of the top and down type original frame is aligned to be displayed in at least one even-numbered sub-field.

3. The stereoscopic image display device of claim 2, wherein the first eye image data displayed in the at least one odd-numbered sub-field are spatially separated from the second eye image data displayed in the at least one even-numbered sub-field.

4. The stereoscopic image display device of claim 2, wherein:
the first eye image data displayed in a plurality of odd-numbered sub-fields are spatially separated from each other; and
the second eye image data displayed in a plurality of even-numbered sub-fields are spatially separated from each other.

5. The stereoscopic image display device of claim 2, further comprising a data interpolator configured to insert at least one interpolation frame between the original frames input from the 3D formatter.

6. The stereoscopic image display device of claim 1, wherein the timing controller is further configured to control the data driving circuit to:
supply the first eye image data in the first sub-field to the data lines according to a sequence of the odd-numbered scan pulses in the first sub-field; and
supply the second eye image data in the second sub-field to the data lines according to a sequence of the even-numbered scan pulses in the second sub-field.

7. The stereoscopic image display device of claim 1, wherein:
the gate driving circuit is further configured to:
sequentially generate $(4n-3)^{th}$ scan pulses in the first sub-field to supply them to $(4n-3)^{th}$ gate lines;
sequentially generate $(4n-2)^{th}$ scan pulses in the second sub-field to supply them to $(4n-2)^{th}$ gate lines;
sequentially generate $(4n-1)^{th}$ scan pulses in a third sub-field to supply them to $(4n-1)^{th}$ gate lines; and
sequentially generate $(4n)^{th}$ scan pulses in a fourth sub-field to supply them to $(4n)^{th}$ gate lines,
where n is a positive integer; and
the data driving circuit is configured to:
supply a first portion of the first eye image data to the data lines according to a sequence of the $(4n-3)^{th}$ scan pulses scan pulses in the first sub-field;
supply a first portion of the second eye image data to the data lines according to a sequence of the $(4n-2)^{th}$ scan pulses in the second sub-field;
supply a second portion of the first eye image data to the data lines according to a sequence of the $(4n-1)^{th}$ scan pulses scan pulses in the third sub-field; and
supply a second portion of the second eye image data to the data lines according to a sequence of the $(4n)^{th}$ scan pulses in the fourth sub-field.

8. The stereoscopic image display device of claim 1, wherein:
the first eye image data comprises left eye image data; and
the second eye image data comprises right eye image data.

9. The stereoscopic image display device of claim 1, wherein the timing control signals includes: a vertical synchronization signal, a horizontal synchronization signal, a data enable signal, and a dot clock signal.

10. The stereoscopic image display device of claim 1, wherein the timing controller is further configured to supply a data control signal to the data driving circuit and a gate control signal to the gate driving circuit at the frame frequency $N \times f$.

11. The stereoscopic image display device of claim 1, wherein the 3D processor includes the 3D formatter.

12. A method of driving a stereoscopic image display device comprising a display panel having a plurality of pixels arranged in odd-numbered pixel lines and even-numbered pixel lines, a patterned retarder that transmits light from the display panel as a first polarization component and a second polarization component, a data driving circuit that drives data lines of the display panel, and a gate driving circuit that drives gate lines of the display panel, the gate lines including a plurality of odd-numbered gate lines and a plurality of even-numbered gate lines, the method comprising:
receiving a frame of input three-dimensional (3D) image data having a first eye image data and a second eye image data alternately arranged;
separating the frame of input three-dimensional (3D) image data into the first eye image data and the second eye image data;
arranging the separated first eye image data and second eye image data according to a vertical k-divisional driving operation to generate a top and down type original frame, where k is a positive even number, the top and down type original frame comprising:
the first eye image data arranged in a first set of contiguous lines; and
the second eye image data arranged in a second set of contiguous lines, the second set of contiguous lines beginning immediately subsequently to the first set of contiguous lines;
receiving timing signals at an input frame frequency f;
dividing the top and down type original frame directly into k sub-fields with time-divisional driving so that each odd-numbered sub-field has at least a portion of the arranged first eye image data and each even-numbered sub-field has at least a portion of the arranged second eye image data; and
controlling the data driving circuit and the gate driving circuit at a frame frequency $N \times f$ based on the k sub-fields, where N is a positive number equal to or greater than 2, to:
at a first time period in one frame, sequentially supply odd-numbered scan pulses respectively to the odd-numbered gate lines only in a first sub-field to display the arranged first eye image data in the first sub-field on the odd-numbered pixel lines of the display panel in the first sub-field only, without supplying any scan pulse to any of the even-numbered gate lines; and
then, at a second time period in the one frame and subsequent to the first time period, sequentially supply even-numbered scan pulses respectively to the even-numbered gate lines only in a second sub-field to display the arranged second eye image data in the second sub-field on the even-numbered pixel lines of the display panel in the second sub-field only, without supplying a scan pulse to any of the odd-numbered gate lines.

13. The method of claim 12, wherein:
the first eye image data of the top and down original frame is aligned to be displayed in at least one odd-numbered sub-field; and
the second eye image data of the top and down original frame is aligned to be displayed in at least one even-numbered sub-field.

14. The method of claim 13, wherein the first eye image data displayed in the at least one odd-numbered sub-field are spatially separated from the second eye image data displayed in the at least one even-numbered sub-field.

15. The method of claim 13, wherein:
the first eye image data displayed in a plurality of odd-numbered sub-fields are spatially separated from each other; and
the second eye image data displayed in a plurality of even-numbered sub-fields are spatially separated from each other.

16. The method of claim 12, wherein the controlling of the data driving circuit and the gate driving circuit includes:
sequentially generating $(4n-3)^{th}$ scan pulses in the first sub-field to supply them to $(4n-3)^{th}$ gate lines;
sequentially generating $(4n-2)^{th}$ scan pulses in the second sub-field to supply them to $(4n-2)^{th}$ gate lines;

sequentially generating (4n−1)$^{th}$ scan pulses in a third sub-field to supply them to (4n−1)$^{th}$ gate lines; and sequentially generating (4n)$^{th}$ scan pulses in a fourth sub-field to supply them to (4n)$^{th}$ gate lines, supplying a first portion of the first eye image data to the data lines according to a sequence of the (4n−3)$^{th}$ scan pulses scan pulses in the first sub-field;

supplying a first portion of the second eye image data to the data lines according to a sequence of the (4n−2)$^{th}$ scan pulses in the second sub-field;

supplying a second portion of the first eye image data to the data lines according to a sequence of the (4n−1)$^{th}$ scan pulses scan pulses in the third sub-field; and supplying a second portion of the second eye image data to the data lines according to a sequence of the (4n)$^{th}$ scan pulses in the fourth sub-field, wherein n is a positive integer.

17. The method of claim 12, wherein:

the first eye image data comprises left eye image data; and the second eye image data comprises right eye image data.

18. The method of claim 12, wherein the timing control signals includes: a vertical synchronization signal, a horizontal synchronization signal, a data enable signal, and a dot clock signal.

19. The method of claim 12, wherein the controlling of the data driving circuit and the date driving circuit includes supplying a data control signal to the data driving circuit and a gate control signal to the gate driving circuit at the frame frequency N×f.

20. The method of claim 12, wherein the controlling of the data driving circuit and the gate driving circuit includes:

supplying the first eye image data in the first sub-field to the data lines according to a sequence of the odd-numbered scan pulses in the first sub-field; and supplying the second eye image data in the second sub-field to the data lines according to a sequence of the even-numbered scan pulses in the second sub-field.

* * * * *